Patented Oct. 19, 1948

2,451,567

UNITED STATES PATENT OFFICE 2,451,567

PROCESS FOR PREPARING STARCH HYDRO-LYZING ENZYME WITH ASPERGILLUS

Elmer H. Le Mense and James M. Van Lanen, Peoria, Ill., assignors to the United States of America as represented by the Secretary of Agriculture No Drawing. Application September 10, 1946, Serial No. 696,023

6 Claims. (Cl. 195—73)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of fungal enzymes and to the use of such enzymes for the hydrolysis of starch and starch products. More particularly it is concerned with the elaboration and properties of highly active starch-hydrolyzing enzymes obtained by the cultivation of certain strains of molds in liquid media under conditions of submerged, aerated growth.

Previous attempts to prepare amylases by submerged culture tenchiques have been generally unsuccessful. Although excellent growth of the amylase-producing fungus was often obtained, only slight formation of enzyme occurred. For this reason the procedure commonly resorted to involves the cultivation of the organism on the unagitated surface of liquid media or on moistened cereal products such as wheat bran, which are either spread in shallow layers on trays or agitated in rotating drums. This method requires considerable processing equipment and space which, together with the requirement for a cereal substrate, adds appreciably to the cost of the enzyme preparation.

We have discovered, as a result of a survey of several hundred molds, several strains of Aspergillus which are capable of remarkably high enzyme synthesis when cultured under special, submerged conditions. Several media have been developed which give good enzyme formation when maintained at the proper reaction and supplemented with a calcium salt. Calcium carbonate can serve both as buffer and as a source of calcium ion. The beneficial action of calcium carbonate is shown in Example 1 below.

Whereas strong aeration was generally found to inhibit amylase synthesis with most fungi studied in the past, we have found with our cultures that the enzyme potency of culture liquors within certain limits is proportional to the degree of aeration. Aeration rates up to one volume of air per volume of medium per minute have been investigated.

The enzyme complex formed by most of these fungi is characterized by the presence of unusually high concentrations of dextrinizing, saccharifying, and proteolytic enzymes. It has been demonstrated with partially purified enzymes that the dextrinizing enzyme in combination with saccharifying enzyme results in a rapid and ultimately high conversion of starch to reducing sugars. When employed as a converting agent in the alcoholic fermentation of grain mashes the proteolytic enzyme is beneficial in supplying protein degradation products as nutrients for the yeast.

The examples given below will serve to demonstrate how our invention may be used to provide enzymes capable of totally replacing barley malt for converting grain mashes in a distillery as well as the use of the enzyme complex for manufacturing food syrups and sweetening agents. Our process is not limited to these applications, however, since with proper control it may be conveniently used to prepare starch degradation products of varying size and physical properties and with a wide variety of industrial uses.

In general, our method consists of preparing a nutrient medium by adding to thin stillage a small amount of ground corn or other available carbohydrate and enough calcium carbonate to prevent undue acidity in the medium. A high degree of acidity is undesirable, a pH range of from 5.0 to 5.5 being considered optimum. The material is sterilized and then inoculated with an actively growing culture of Aspergillus capable of enzyme production in submerged culture. During the course of incubation, the culture is aerated by introducing sterile air, and after a period of from two to seven days, the amylase potency of the material reaches a level sufficient for converting normal grain mashes.

For alcohol production, the enzymic preparation is used in much the same manner as malt for both preliminary liquefaction and final saccharification. The unfiltered mold culture is added directly to the cooked grain mash in an amount equivalent to approximately 10 per cent of the total mash volume and saccharification is allowed to proceed for about 30 minutes at 55° C. The converted mash is then cooled, inoculated with yeast and fermented according to normal distillery practice. The enzymic agent produced and used as described above has several distinct advantages over those produced by other processes, viz.: (1) malt can be completely replaced in the saccharification of gelatinized starch mashes; (2) alcohol yields exceed those from any other method of starch saccharification; (3) the rate of alcoholic fermentation is increased; (4) no extra processing equipment other than that used in conventional distillery practice is required; and (5) no undesirable odors or flavors are found in the final products.

For the production of syrups or sweetening agents the procedure outlined above is followed except that the saccharification is allowed to continue for two to three hours, after which the saccharified mash is filtered, clarified and concentrated to the desired density.

Where stillage is not available as a medium, corn meal, soybean meal, tankage, corn steep liquor and combinations of these materials may be substituted for the stillage with comparable production of enzymes.

EXAMPLE 1

Into each of 10 one-liter Erlenmeyer flasks was placed 200 ml. of thin stillage and 2 gm. of corn meal. To the first pair of flasks no calcium carbonate was added, and to each of succeeding pairs was added 0.2, 0.5, 1.0 and 2.0 gm. of calcium carbonate. The flasks were plugged with cotton and sterilized with steam at 22 pounds gauge pressure for one hour. The flasks were then cooled and inoculated with 5 percent by volume of a 24-hour liquid culture of *A. niger* NRRL 337. The flasks were placed on a mechanical shaker giving approximately 90 three-inch strokes per minute. After three days' incubation with continuous shaking, the cultures were analyzed for their content of starch-dextrinizing enzyme. The influence of calcium carbonate additions upon amylase formation is shown below.

Table 1

| Calcium carbonate added, gm./200 ml. | Reaction of the medium, pH | Amylase production, units/ml. |
|---|---|---|
| None | 4.0 | 94 |
| 0.2 | 4.3 | 440 |
| 0.5 | 4.9 | 515 |
| 1.0 | 5.3 | 535 |
| 2.0 | 5.4 | 490 |

It may be seen from these data that the addition of calcium carbonate even at a level of 0.2 gm. per 200 ml. resulted in almost a fivefold increase enzyme potency. The highest concentration of enzyme, however, was formed in media containing 1.0 gm. of calcium carbonate per 200 ml. of medium. This level of calcium carbonate raised the pH of the medium to 5.3 as compared with pH 4.0 in the unsupplemented control. The addition of calcium carbonate, therefore, results in greatly improved production and stability of the enzyme. This permits use of the culture liquor in much smaller quantities for the saccharification of starch in the manufacture of alcohol or food syrups.

EXAMPLE 2

An eight-liter Pyrex glass cylinder was equipped with a ¼-inch perforated aluminum tube air sparger and with an aluminum lid. Into this cylinder was placed 4 liters of thin stillage (screened residue obtained from an alcoholic fermentation of corn and barley malt), 80 grams of ground corn, and 40 grams of calcium carbonate.

This medium was sterilized with steam at 25 pounds per square inch gauge for 30 minutes, after which the medium was cooled to 28° C. and inoculated with 100 ml. of an actively growing submerged culture of *A. niger* NRRL 337. The medium was then aerated with sterile, humidified air at a rate of 2,000 ml. of air per minute. After periods of 2, 4, and 7 days' incubation, samples of the culture liquor were removed and examined for their ability to replace barley malt in the alcoholic fermentation of corn. The fermentation test was carried out by weighing 50 grams of ground corn into 18 500-ml. Erlenmeyer flasks and adding 170 ml. of tap water heated to 70° C. To each flask was then added 5 ml. of the same culture liquor as was used in the subsequent saccharification step and the temperature was maintained at 70° C. for 15 minutes, the mashes being intermittently agitated during this period. The mashes thus preliquefied were next cooked for 30 minutes at 25 pounds steam pressure per square inch gauge, then cooled to 75° C. and converted with the mold culture liquors in the following manner: To the first set of duplicate flasks, 20 ml. of culture liquor which had been incubated 2 days was added with 40 ml. of cold tap water; to the second set, 40 ml. of culture liquor and 20 ml. of water; and to the third set, 60 ml. of culture liquor. Samples which had been incubated for 4 and 7 days were employed in the same manner. Two control flasks containing 45 gm. of grain liquefied with 0.5 gm. of barley malt and converted with 4.5 gm. of barley malt in 60 ml. of slurry were also included. By the addition of 60 ml. of converting agent to each flask the temperature of the mash was lowered to 57° C. The flasks were held at this temperature for 30 minutes during which period the mashes were agitated intermittently. They were then cooled to 28° C. and inoculated with 3 percent by volume of a 24-hour culture of distillers yeast NRRL Y-567. After fermentation was carried out for 65 hours, the alcohol was distilled from an aliquot of the mashes and alcohol was determined in the distillates by means of a refractometer. The results of this experiment are shown in the table below. It may be seen from these data that culture liquors from this strain of *A. niger* grown for only 2 days do not contain sufficient enzymes to saccharify the starch in a manner comparable to malt. However, after 4 and 7 days, both the 16 and 24 percent levels gave higher alcohol yields than the 10 percent (by weight) malt control, and after 7 days the 8 percent level gave almost as much alcohol as the malt control.

Table 2

| Age of *Aspergillus niger* culture | Volume of culture used, percent of mash volume | Yield of alcohol proof gallons per 56 lb. bushel |
|---|---|---|
| 2 days | 8 | 4.06 |
| 2 days | 16 | 4.52 |
| 2 days | 24 | 4.86 |
| 4 days | 8 | 4.62 |
| 4 days | 16 | 5.26 |
| 4 days | 24 | 5.50 |
| 7 days | 8 | 5.00 |
| 7 days | 16 | 5.37 |
| 7 days | 24 | 5.39 |
| Malt control (10% of weight of grain) | | 5.10 |

The adaptation of our process to pilot scale equipment is described in the following experiment.

EXAMPLE 3

To a 600-gallon fermenter equipped with a perforated pipe air sparger were added 300 gallons of thin stillage (similar to that used in Example 1 above), 60 pounds of ground corn, and 15 pounds of calcium carbonate. The pH of the medium was 5.2. This medium was sterilized for two hours with steam at a pressure of 15 pounds per square inch gauge, cooled to 28° C., and inoculated with 25 gallons of an active culture of *A. niger*, NRRL 337. The culture was incubated for three days at this temperature and was aerated with sterile air continuously at a rate of 25 c. f. m. After this period of incubation the culture liquor contained 650 alpha amylase saccharification units and was then employed as a saccharification agent in an alcoholic fermentation of corn in the following manner:

Sixteen bushels of ground corn were made up in a slurry with water in a horizontal cooker to give a total volume of 310 gallons. Nine gallons of the above *A. niger* culture liquor was added and the temperature was raised to 67° C. After being held at this temperature for 5 minutes the mash was brought to 155° C. and again held for 5 minutes. The mash was then cooled to 60° C. and 80 gallons of the mold culture liquor was added. By the addition of this liquor the temperature was lowered to 55° C. where it was held for a period of 30 minutes. The converted mash was then cooled to 28° C. and inoculated with 25 gallons of a 24-hour culture of distillers yeast, NRRL Y-567. The final volume was 630 gallons. In the table below are given the pertinent data from this fermentation.

Table 3

| Age | Reducing sugar as maltose | Yield of alcohol | |
|---|---|---|---|
| | | Percent by volume | Proof gallons per bushel |
| Hours | Percent | | |
| 0 | 10.4 | | |
| 24 | 2.46 | 4.78 | 3.77 |
| 48 | 0.25 | 6.77 | 5.33 |
| 65 | 0.14 | 6.77 | 5.33 |

From these results it may be seen that the enzymes produced by this strain growing in thin stillage resulted in a rapid conversion of starch to reducing sugar and a rapid fermentation of this sugar to alcohol. It should be noted that the fermentation was essentially complete in 48 hours as evidenced by both residual sugar values and by the concentrations of alcohol formed. The final alcohol yield was slightly greater than the average obtained with 10 percent barley malt under comparable conditions.

EXAMPLE 4

The preparaton of an enzyme saccharified syrup is demonstrated by the following experiment. Twenty-two and one-half pounds of granular wheat flour and 40 pounds of water were introduced into an experimental cooker equipped with steam jets and agitator. One quart of mold culture liquor produced as described in Example 3 was added and the temperature was raised to 70° C. After 5 minutes at 70° C. steam was introduced to bring the temperature to 126° C. The mash was held at 126° C. for 10 minutes and was then lowered to 60° C. by applying cold water to the external surface of the cooker. Four and three-fourths gallons of mold culture was added and the temperature was maintained at 60° C. for 2 hours. Steam was again introduced to raise the temperature to 85° C. where the slurry was held for 15 minutes. The final volume of mash was 16.75 gallons. The mash was clarified by filtration and the filtrate analyzed for its content of reducing sugar. Analyses showed that 77.5 percent of the theoretical starch was present as maltose, after correcting for the sugar present as glucose. The filtrate was treated with activated carbon and evaporated to approximately 80 percent solids. The resulting product had a pleasing bland flavor and lacked any noticeable odor attributable to the mold enzyme.

While the examples described above are confined to the use of a single medium for producing the enzyme preparation, other types of media can be employed equally well and the enzymes produced have numerous other industrial applications. The examples given are merely illustrative rather than limitative to the scope of our invention.

A study has been made of other protein and carbohydrate materials which could be employed for producing amylases by these organisms. It has been found that corn, wheat, corn gluten, wheat gluten, corn steep liquor and tankage are suitable sources of nitrogenous material while starch, glucose, and molasses are satisfactory sources of carbohydrate adjunct. Media containing combinations of these carbohydrate and nitrogenous compounds to give concentrations of 2 to 10 gm. of dry substance per 100 ml. of medium give enzyme potencies comparable to media containing stillage.

Aeration is preferably accomplished by introducing sterile air into the fermenting medium. Agitation is also desirable and when combined with aeration it enhances growth and enzyme elaboration. The volume of air required may range from 10 to 200 percent of the volume of medium per minute. We prefer, however, to aerate at a rate between 50 and 100 percent of the mash volume per minute.

For growth and enzyme production the reaction of the medium might range between pH 3.5 and 8.0. However, we prefer to operate under our conditions between pH 5.0 and 5.5. By the addition of calcium carbonate to our media, this reaction is easily maintained. Other buffers such as those containing phosphates, acetates, citrates, etc., could also be employed in place of calcium carbonate.

The temperature range permissible for growth and enzyme production may extend from 15° to 35° C. The optimum temperature lies between 22° and 30° C.

The period of incubation varies with the medium, aeration rate, pH, and temperature. Generally under optimum conditions, enzyme production approaches the maximum within two to five days.

Inoculum may consist of 1 to 10 percent by volume of the volume of medium. Approximately 5 percent is generally used. The age of inoculum may vary from one to several days.

Of the many cultures investigated for ability to produce highly active amylase systems under submerged conditions only a few species were found active. All of the active species belonged to the genus Aspergillus. However, even within a species, only a few strains of many tested were found satisfactory. This variation was especially evident in the survey of strains within the *A. niger* species where only four strains of nearly 200 tested formed the enzyme complex. Some of the cultures which we have found satisfactory include *A. niger*, NRRL strains 679, 326, 330, and 337; *A. foetidus*, NRRL 341; *A. fuscus*, NRRL 363; *A. oryzae*, NRRL 694; *A. flavis oryzae*, NRRL 449; and *A. wentii*, NRRL 378.

Having thus described our invention, we claim:

1. A process of producing a starch hydrolyzing enzyme complex, which complex contains dextrinizing and saccharifying enzymes, which comprises growing a culture of *Aspergillus niger*

NRRL 337 under aerated submerged growth conditions, in a liquid medium comprising a mash of thin stillage, corn meal, and calcium carbonate, the aeration rate being between 10 and 200 percent of the volume of the mash per minute, the medium being buffered to a pH between 4.5 to 6.0.

2. The process of claim 9 in which the pH is maintained between 5.0 and 5.5.

3. The process of claim 9 in which the pH is maintained between 5.0 and 5.5 and the temperature between 22° and 30° C.

4. A process of producing a starch hydrolyzing enzyme complex, which complex contains dextrinizing and saccharifying enzymes, which comprises growing a culture of Aspergillus of the group consisting of *A. niger, A. foetidus, A. flavus oryzae, A. fuscus, A. oryzae,* and *A. wentii* under aerated submerged growth conditions in a liquid medium comprising a nutrient mash and calcium ion, the aeration rate being between 10 and 200 percent of the volume of the mash per minute, the pH being buffered to 4.5 to 6.0.

5. The process of claim 4 in which the pH is maintained between 5.0 and 5.5.

6. A process of producing a starch hydrolyzing enzyme complex, which complex contains dextrinizing and saccharifying enzymes, which comprises growing a culture of Aspergillus of the group consisting of *A. niger, A. foetidus, A. flavis oryzae, A. fuscus, A. oryzae,* and *A. wentii,* under aerated submerged growth conditions in a liquid medium containing thin stillage, corn meal, and calcium carbonate, said medium being buffered to a pH between about 4.5 to 6.0, the aeration rate being between 10 and 200 percent of the volume of the mash per minute, and the temperature being maintained between 22° and 30° C.

ELMER H. LE MENSE.
JAMES M. VAN LANEN.

REFERENCES CITED

The following references are of record in the file of this patent:

UNITED STATES PATENTS

| Number | Name | Date |
|---|---|---|
| 977,200 | Lasche | Nov. 29, 1910 |
| 1,054,324 | Tukamin | Feb. 25, 1913 |
| 2,219,668 | Underkofler | Oct. 29, 1940 |
| 2,291,009 | Underkofler | July 28, 1942 |

---

Certificate of Correction

Patent No. 2,451,567.   October 19, 1948.

ELMER H. LE MENSE ET AL.

It is hereby certified that errors appear in the printed specification of the above numbered patent requiring correction as follows:

Column 7, line 8, claim 2, and line 10, claim 3, for the claim reference numeral "9" read *1*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*

NRRL 337 under aerated submerged growth conditions, in a liquid medium comprising a mash of thin stillage, corn meal, and calcium carbonate, the aeration rate being between 10 and 200 percent of the volume of the mash per minute, the medium being buffered to a pH between 4.5 to 6.0.

2. The process of claim 9 in which the pH is maintained between 5.0 and 5.5.

3. The process of claim 9 in which the pH is maintained between 5.0 and 5.5 and the temperature between 22° and 30° C.

4. A process of producing a starch hydrolyzing enzyme complex, which complex contains dextrinizing and saccharifying enzymes, which comprises growing a culture of Aspergillus of the group consisting of A. niger, A. foetidus, A. flavus oryzae, A. fuscus, A. oryzae, and A. wentii under aerated submerged growth conditions in a liquid medium comprising a nutrient mash and calcium ion, the aeration rate being between 10 and 200 percent of the volume of the mash per minute, the pH being buffered to 4.5 to 6.0.

5. The process of claim 4 in which the pH is maintained between 5.0 and 5.5.

6. A process of producing a starch hydrolyzing enzyme complex, which complex contains dextrinizing and saccharifying enzymes, which comprises growing a culture of Aspergillus of the group consisting of A. niger, A. foetidus, A. flavis oryzae, A. fuscus, A. oryzae, and A. wentii, under aerated submerged growth conditions in a liquid medium containing thin stillage, corn meal, and calcium carbonate, said medium being buffered to a pH between about 4.5 to 6.0, the aeration rate being between 10 and 200 percent of the volume of the mash per minute, and the temperature being maintained between 22° and 30° C.

ELMER H. LE MENSE.
JAMES M. VAN LANEN.

REFERENCES CITED

The following references are of record in the file of this patent:

UNITED STATES PATENTS

| Number | Name | Date |
| --- | --- | --- |
| 977,200 | Lasche | Nov. 29, 1910 |
| 1,054,324 | Tukamin | Feb. 25, 1913 |
| 2,219,668 | Underkofler | Oct. 29, 1940 |
| 2,291,009 | Underkofler | July 28, 1942 |

---

Certificate of Correction

Patent No. 2,451,567. October 19, 1948.

ELMER H. LE MENSE ET AL.

It is hereby certified that errors appear in the printed specification of the above numbered patent requiring correction as follows:

Column 7, line 8, claim 2, and line 10, claim 3, for the claim reference numeral "9" read 1;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*